United States Patent Office 2,946,822
Patented July 26, 1960

2,946,822

PURIFICATION OF M-PHENYLENEDIAMINE

Leslie M. Schenck, Westfield, and Dennis L. Deutsch, Cranford, N.J., assignors to General Aniline & Film Corporation, New York, N.Y., a corporation of Delaware No Drawing. Filed Oct. 5, 1956, Ser. No. 614,047

6 Claims. (Cl. 260—582)

This invention relates to a new and improved method for purifying m-phenylenediamine, and is particularly concerned with an improved method of separating m-phenylenediamine from traces of the isomeric o- and p-phenylenediamines, whereby a product of high purity may be obtained in a more economic manner than heretofore.

Briefly stated, the process of the present invention resides in our discovery that m-phenylenediamine, such as that obtained by reducing a commercial grade of m-dinitrobenzene by the conventional Bechamp, or other known reduction method, can be separated from the isomeric ortho- and paraphenylenediamines, which are present as impurities, by treating the impure phenylenediamine with a salt or acid containing a chromate, or dichromate anion; for example, sodium chromate or sodium bichromate, or a compound which reacts with water to form such anions, such as chromium oxide; and removing any precipitate that may form, either by filtration, centrifuging; or the precipitate, if heat stable, may be left behind on the distillation of the m-phenylenediamine. The m-phenylenediamine thus obtained is essentially free of o- or p-isomers, or their by-products, and, after distillation, yields a practically colorless product stable to heat, light and air, and of good purity.

While m-phenylenediamine, contaminated by some of the o- and p-isomers, when freshly distilled is substantially colorless, it darkens rapidly on exposure to air, heat or light, and, ultimately, becomes tarry. In addition to the reduced stability to air, heat and light, the presence of o- and p-isomers in m-phenylenediamine interfere with many uses of the m-phenylenediamine. Thus, the o- and p-isomers, because of their strong reducing action, cause decomposition of diazonium compounds. Hence, if impure m-phenylenediamine is used as a component for azo dyes, persistent foaming is encountered in the coupling reaction because of the generation of nitrogen. Furthermore, the decomposition products of the diazonium compounds contaminate the dye and lower yields are obtained. There may be cited, as a prime example of this observation, the manufacture of Dianil Brown, 3 CN, and Direct Black EW, as described by Fierz-David and Blangey, "Fundamental Processes of Dye Chemistry," 1949, pages 288 to 292.

Heretofore, m-phenylenediamine, once prepared, could be separated from its isomers only with great difficulty, and only a small amount of the o- and/or p-isomers in the meta compound is sufficient to reduce its stability. The separation by distillation is not feasible commercially, due to the close boiling points of three isomers: o-isomer=258° C.; p-isomer=267° C.; m-isomer=284° C. ("Lange Handbook of Chemistry," 1946, Handbook Publishers, Inc., Sandusky, Ohio). It is well known to the art that each of the isomers can be purified by recrystallizing the corresponding mineral acid salts, including the hydrochloride, sulfate or nitrate. This method is of too great an expense to appeal to commercial manufacture (Org. Synthesis Cd., vol. II, p. 502).

Accordingly, the most practical method heretofore available for producing pure m-phenylenediamine has been to employ an extremely pure m-dinitrobenzene. However, the preparation of m-dinitrobenzene, which is uncontaminated by the o- and p-dinitrobenzene is, itself, quite difficult. The dinitrobenzene is normally prepared by the nitration of nitrobenzene, and its preparation is well known in the art, suitable methods for the preparation of dinitrobenzene being described, for example, in the following references: BIOS 1144; BIOS 986, pages 117; P.B. 25, 263; Fierz-David and Blangey, "Fundamental Processes of Dye Chemistry," 1949 (page 111). Nitration of nitrobenzene, in accordance with these known processes, always yields, in addition to m-dinitrobenzene, 5–15% of ortho- and para-isomers, the quantity of these being larger, the higher the temperature (O. Wyler, Helv. Chim. Acts. 15, 23 (1932)).

It is of utmost important that these isomers be removed in order to obtain, on reduction, m-phenylenediamine which gives good yields of dyes and is, furthermore, stable to air, heat and light. For this reason, the accelerated reactivity of o- and p-dinitrobenzene, in respect to m-dinitrobenzene, is the basis of the commercial methods of purifying crude m-dinitrobenzene. The most common of these purification methods is the reaction of a crude m-dinitrobenzene with sodium sulfite or sodium bisulfite and caustic soda. By this operation, the bulk of the o- and p-isomers is converted to the nitrosulfonic acids, and, then, through reduction, to the aminosulfonic acids which are water-soluble compounds and can consequently by easily removed (BIOS 1144; BIOS 986, page 117; P.B. 25623, page 346; Fierz-David and Blangey, "Fundamental Processes of Dye Chemistry," 1949, page 112). Other methods include the reaction with caustic soda or sodium alcoholates, yielding the corresponding phenol, anisol or phenetol derivatives. The solidification point of the dinitrobenzene, as obtained from the nitration is usually 81–82° C. By purifying, using one of the above methods, the solidification point (S.P.) can be increased to 89–90° C. (M.P. 90.7–91.4° C., loc. cit.). To attain this higher degree of purity, a more energetic reaction with sodium sulfite, caustic soda, or alcoholates is required at a prohibitive expense in yield of the desired m-dinitrobenzene, since m-dinitrobenzene also reacts with any of the above reagents, but at a much slower rate. For this reason, commercial manufacture is limited to 88°–90° C. S.P. material. Consequently, it is not commercially economical to produce m-dinitrobenzene of the extreme purity necessary to give, upon reduction, a pure and stable m-phenylenediamine.

It is, therefore, the primary object of the present invention to provide a method of purifying m-phenylenediamine obtained by reduction of m-dinitrobenzene of a practical commercial degree of purity; such as the 88 to 89° C. S.P. material, mentioned above, which still contains, however, some of the o- and p-isomers.

The present invention is directed to the purification of m-phenylenediamine, rather than the preparation of the m-phenylenediamine, per se. The methods known in the art for the reduction of m-dinitrobenzene to m-phenylenediamine may be used, and suitable specific methods for its preparation have been described. For the sake of completeness, the following references to detailed specific procedures for its preparation are cited: P.B. 7036, page 6689; A. W. Hoffmann, Proc. Royal Soc. London II, 521, 12, 639; Schultz, Die Chemie des Steinkohlenteers, 4th edition, volume I, page 198; Pomeranz, G.P. 269, 542; Micewiez, Roczinki Chem. 8, 50; Fierz-David and Blangey, "Fundamental Processes of Dye Chemistry," 1949, (page 115), and a detailed description of a typical process is given in Fierz-David and Blangey's book (loc.

cit.). According to this process, m-dinitrobenzene is reduced with iron borings and dilute hydrochloric acid at temperatures of 95–100° C. Other processes use sulfuric acid, acetic acid or other acidic materials well known to the art. This type of reduction technique is commonly referred to as the Bechamp method. Furthermore, m-phenylenediamine can be prepared by catalytic reduction of the precursory dinitro compound, as well as by zinc reduction and/or various reductions known to the art.

The chemical behavior of the three isomeric phenylenediamines is well known to the art. It is reported that o-phenylenediamine will form addition compounds with metal salts, including $AgNO_3$ (Willstater, Pfannenstiel, Ber. 38, 2352); $CuCl_2$, $CuSO_4$, $Cu(NO_3)_2$, $ZnCl_2$, $CdCl_2$ and $CoCl_2$ (Hieber, Schlieszmann, Ries, Z. Anorg. Chem. 180, 100, 101, 226, 227, 228); $ZnBr_2$ (Wahl, Centr. I, 1929, 1432); $ZnI_2$ (Hieber, Appel. Z. Anorg. Chem. 196, 198); $SnCl_4$ (Hieber, Appel. Ann. 444, 262); $H_4[Fe(CN)_6]$ (Cumming, J. Chem. Soc. 123, 2463), and $NiCl_2$ (Feigl, Furth, Monatsh. 48, 446).

It is further disclosed that when nitrosoalkyldialkylanisidine, or toluidines, are reduced by zinc in hydrochloric acid solution, or when aqueous solutions of mercury, zinc or cadmium salts are added to solutions of diamines, sparingly soluble compounds are formed (Imperial Chem. Ltd. and A. Riley, British Patent 297,989, October 17, 1927). There is also reported that phenylenediamines and salts of cobalt, nickel and copper form amines (R. Cernatescu et al., Ann. Sci. Univ. Jassy 18, 385–403 (1933)), loc. cit., 18, 404–414 (1933); loc. cit., 20, 154–172 (1934)). Hieber and Ries (Z. Anorg. Allgem. Chem. 180, 105–109 (1929)), postulate the following structural formula is obtained when o- and p-phenylenediamine are treated with zinc, cadmium and cobalt salts:

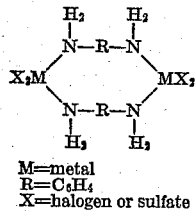

M=metal
R=$C_6H_4$
X=halogen or sulfate

Hieber and Ries state the metal compounds formed with p-phenylenediamine exhibit greater stability than those of the ortho-isomer.

In a study of the stereochemistry of zinc, cadmium and copper (Wahl, III, Nord. Kemistmotet, 172–6, 1928, Centr. 1929, I, p. 1432), it is disclosed that the complexes of o-, m- and p-phenylenediamine with these metals exist in neutral aqueous solutions as stable, slightly soluble compounds. Hieber and Wagener (Ann. 444, 256–65), report a study of compound formation between diamines and tin halides. Likewise, a study of the complex compounds of cobalt and phenylenediamines has been reported (Chem. Zentr. I, 609 (1926)). The use of copper sulfate in connection with analytical determinations of phenylenediamines is described by Kul'berg (Zhur. Anal. Khim 2, 198; C.A. 43, 6945 (1949)). The chemistry of chelating of the phenylenediamines is covered by Martell and Calvin in their book "Chemistry of the Metal Chelate Compounds" (Prentice-Hall Inc.; 1952).

In view of the teachings of the art, such as Kul'berg (loc. cit.) that both m- and p-phenylenediamine under similar reaction conditions precipitate by the addition of copper sulfate; and the claim of Wahl (loc. cit.) that he obtained with zinc or cadmium bromide, or copper salts, precipitates with all three isomeric phenylenediamines, which are very slightly soluble and stable; it would seem obvious, for example, that if a mixture of m- and p-phenylenediamine is treated with, say, copper sulfate, that both compounds will form stable complexes or precipitates. As a result, part of the m-phenylenediamine, in solution, would be removed as a metallic complex. Likewise, it would be anticipated from the teachings of the literature that treatment of a mixture containing m- and o-phenylenediamine, or a mixture of the three isomeric phenylenediamines, with salts of heavy metals, would behave in a similar manner.

While the formation of complexes of various isomeric phenylenediamines, with heavy metals, is known in the art, it will be noted that the complexes are formed with the cation of heavy metal salts. Surprisingly, we have discovered that compounds containing a chromium containing anion, such as sodium bichromate, will also form an insoluble complex with phenylenediamines. Thus, when an aqueous solution of sodium bichromate is added to an aqueous solution of p-phenylenediamine, a chromate complex of the p-phenylenediamine is formed instantaneously, even at room temperature, and precipitates. When the same thing is done with the o-isomer, a complex and resultant precipitate is formed only slightly slower, but still almost instantaneously. However, when an aqueous solution of sodium bichromate is added to an aqueous solution of m-phenylenediamine, an insoluble complex is formed only when the mixture is stored for a long time, at room temperature; or somewhat more rapidly, but still quite slowly when compared with the complex of the p- and o-isomers, at elevated temperatures up to about 100° C.

Thus, by adding a compound containing a chromate anion, e.g., sodium bichromate or sodium chromate, to a mixture of o-, m- and p-phenylenediamines, it is possible to form addition compounds, or complexes with the chromate anions of the o-, and p-phenylenediamine in a manner unknown and unexpected in the art; and to remove these complexes from the m-phenylenediamine before any appreciable amount of the chromate complex of the m-phenylenediamine is formed. Thus, it is apparent that we have discovered a very practical and economical method for removing o- and p-phenylenediamine contaminants from m-phenylenediamine, which, as disclosed in previous literature citations cause much difficulty in storage and consumption of the m-phenylenediamine in the chemical industry. The solidification point of the m-phenylenediamine, as obtained by our process, is about 63.45° C. (the melting point, which is usually about 0.5° C. higher than the solidification point, has previously been reported to be 62.8° C.). Investigation in our laboratory has disclosed that the reaction of the chromate anion with the o- and/or p-phenylenediamine is not due to an oxidation process, as might be expected in view of the oxidizing action of potassium permanganate on phenylenediamines under similar conditions (J. Applied Chem. U.S.S.R. 9, 846 (1936)), since potentiometric titrations of standard solutions did not indicate a "redox potential." It is highly probable that the phenomenon observed with the chromate anion is comparable to those previously reported with certain metal cations. However, it is particularly surprising, since similar formations of insoluble complexes are not observed when a compound having a chromium cation is added to phenylenediamines; e.g., no noticeable insoluble precipitate is formed when chromic acetate, or chromic chloride, is added to any of the phenylenediamines.

In brief, therefore, our invention consists in the reduction of commercial grade of m-dinitrobenzene containing appreciable amounts of o- and p-dinitrobenzene; e.g., a product having a solidification point of 88–89° C., by the conventional Bechamp, or any other standard, reduction method; and, thereafter, treating the resultant m-phenylenediamine (which, however, contains appreciable amounts of o- and p-phenylenediamine) with a compound having a chromate anion—e.g., chromic acid sodium or potassium bichromate or chromate, and any precipitate which may form is then removed from the m-phenylenediamine, preferably, by filtration or centrifuging, although, if the complex is heat-stable, it may be left behind on distillation of the m-phenylenediamine.

The m-phenylenediamine thus obtained is essentially free of the o- and p-isomers and their by-products; and, after distillation, yields a practically colorless product, stable to heat, light and air.

*Example No. 1*

Into a 2-liter steel kettle was charged 1,250 cc. water, 375 g. iron borings and 25 cc. 20° Bé. hydrochloric acid. Heat to 95–97° C. and, while agitating fast, add in 6–7 hours 210 g. m-dinitrobenzene, having an S.P. of 88–89° C. When all in, hold at 96–98° C. for 1 hour longer. Then cool to 85° C. and add slowly 15 g. soda ash until the mixture is slightly alkaline, and there is no more soluble iron present in the solution. Filter hot. Add to the filtrate at 65–70° C. 20 g. sodium bichromate and hold at this temperature for ½ hour longer. Filter hot. Wash the cake with some warm water. Thereafter, distill off the water and distill the crude product in vacuum (B.P.$_2$—128°132°). The yield is 113.6 g. or 84.2% of theory. S.P. of material—63.15° C.

*Example No. 2*

Into a 2-liter steel kettle was charged 1,250 cc. water, 375 g. iron borings and 25 cc. 20° Bé. hydrochloric acid. Heat to 95–97° C. and, while agitating fast, add in 6–7 hours 210 g. m-dinitrobenzene, having an S.P. of 88–89° C. When all in, hold at 96–98° C. for 1 hour longer. Then cool to 85° C. and add slowly 15 g. soda ash until the mixture is slightly alkaline and there is no more soluble iron present in the solution. Filter hot. Cool to room temperature. Then, add to the cooled filtrate 6 grams sodium bichromate and stir for ½ hour at room temperature. Then, in order to remove any possible excess of bichromate, add 12 grams of barium hydroxide crystals.

Stir and filter cold (room temperature). Wash the filter cake, which is composed primarily of the chromate complexes of the o- and p-phenylenediamines and barium chromate. Thereafter, distill off the water from the filtrate, and distill the thus recovered crude m-phenylenediamine under vacuum. The yield in several experiments, conducted as above described, varied from 121 to 124 grams, or 90 to 95% of theory. The solidification point of the refined m-phenylenediamine was 63.5° C.

From a consideration and comparison of Examples 1 and 2, above, it will be apparent that improvement of yield is obtained if the temperature, at which the treatment with the sodium bichromate is effected, is about room temperature. Thus, in Example 1, a somewhat greater excess of bichromate was employed, since at the temperature at which it was added, 85° C., some formation of the complex of m-phenylenediamine with chromate anion, took place, with resultant loss of m-phenylenediamine. Also, it will be apparent, from Example 2, that it is preferable to remove the excess chromate by addition of a precipitant therefor, such as barium hydroxide, although other precipitates, such as barium chloride, may be used, if desired. This removal of excess chromate is desirable for several reasons. First, it prevents formation, during distillation, of any complex, or precipitate, between the excess chromate and m-phenylenediamine, with resultant loss of m-phenylenediamine, at the temperatures employed for distillation; and, further, it assures complete removal of chromate, and no residue of chromate complex of m-phenylenediamine in the residue from distillation of m-phenylenediamine.

As illustrated by Example 1, the complex of the o- and p-phenylenediamine and, also, any m-phenylenediamine, which may complex if slightly elevated temperatures are used, is preferably removed prior to distillation of the m-phenylenediamine. While it is possible to remove the m-phenylenediamine from the complex of the o- and p-isomers with the chromate, by distillation, such procedure is less preferable, since there is a tendency for some of the m-phenylenediamine to form a complex; and, thus, be lost at the temperature used for distillation, and, in addition, extra precautions should be exercised to be sure that the residue remaining after distillation of the m-phenylenediamine, does not ignite, since we have found that, if the residue remaining after distillation contains any complex of a phenylenediamine, there is a possibility that it may ignite when the vacuum is broken, following distillation, unless nitrogen is fed into the still, or other suitable precautions observed.

We have also found that the residue remaining after distillation of the m-phenylenediamine, if the residue contains any chromate complexes of phenylenediamine, is apt to be quite difficult to remove from the still; while, if all excess chromate and chromate complexes of the phenylenediamines (o- and p-phenylenediamine) are removed prior to distillation, difficulties due to the ignition of the still residue are not encountered, and any still residue can be removed by merely washing the still with water.

In order to remove excess chromate before distillation of the m-phenylenediamine, the addition of barium hydroxide, as illustrated in Example 2, is preferred. However, other precipitants, such as barium chloride, may be employed, but are somewhat less preferred, since sodium chloride is formed by reaction between barium chloride and sodium bichromate; and the salt may be corrosive to the still. When barium hydroxide is used, to remove excess chromate, it will be apparent that sodium hydroxide is formed, and corrosion problems with steel equipment are not encountered.

Alternatively, lead chromate is quite insoluble, and, thus, a lead salt may be added to remove excess chromate, if desired; but is less preferred than a barium hydroxide. Surprisingly, calcium chromate is quite soluble, and, therefore, calcium salts are not preferred.

While, for ease of operation, it is preferred to employ a filtrate obtained on reduction of m-dinitrobenzene, it will be apparent that, if desired, commercial anhydrous m-phenylenediamine may be employed, and a solution of it, in water, prepared and treated with a compound containing a chromate anion. This method of operation is illustrated by the following examples.

*Example 3*

150 grams of commercial m-phenylenediamine are dissolved in 1250 ccs. of water, by heating to 80° C., and, at this temperature, 15 grams of sodium bichromate are added with stirring, and the solution stirred for ½ hour at 80–85° C., and then filtered. After distilling off the water from the filtrate the m-phenylenediamine is distilled under vacuum, and a stable, colorless product obtained in good yield. Care should be exercised on breaking the vacuum, following distillation, to avoid ignition of the still residue.

*Example 4*

A solution of 150 grams of commercial m-phenylenediamine, in 1250 ccs. water, was prepared by heating to 80° C., and the solution was then cooled to room temperature. 6 grams of sodium bichromate were then added while stirring, and the solution stirred at room temperature for ½ hour. 12 grams of barium hydroxide crystals were then added, and, after further stirring for a short time, the mixture was filtered at room temperature. After distilling off the water from the filtrate, the m-phenylenediamine was distilled under vacuum, giving a stable, colorless product in good yield. The residue was easily removed from the still by washing with water.

For ease of operation, it is preferable to employ a water-soluble compound containing a chromate, a bichromate, anion; e.g., sodium chromate, or sodium bichromate, since the salt can readily be added to an aqueous solution of the m-phenylene diamine, and the insoluble product formed with the o- and p-phenylenediamine readily separated from the solution of the m-phenylenediamine. The amount of sodium chromate or bichromate added is not critical, but, of course, must be sufficient to react with the o- and p-phenylenediamine contained in the crude product. It will be apparent that a molar amount of chromate compound, equivalent to the o- and p-phenylenediamine, must be used in order to assure complete removal of the o- and p-isomers. Preferably, a slight excess should be used. If the operation is conducted at room temperature, as is preferred, only a very slight excess of chromate compound is required, since there is essentially no formation of m-phenylenediamine chromate complex at room temperature. If, however, the process is operated at a slightly elevated temperature, somewhat greater excess of chromate compounds is used, since there is some formation of complex with m-phenylenediamine at slightly elevated temperatures. In spite of the loss of m-phenylenediamine, temperatures within the range of 50–100° C. may be employed, since the loss of m-phenylenediamine is not too great at these temperatures, and somewhat more concentrated solutions may be employed. Temperatures above about 100° C. are, however, definitely less preferred, since loss of m-phenylenediamine becomes unduly great at such temperatures, and there may be some tendency for thermal decomposition to take place.

It will also be noted that the process of the present invention can be used to purify not only m-phenylenediamine, itself, but also m-phenylenediamines containing such substituents as halogen, hydroxy, alkoxy, alkyl (preferably lower alkyl), or aryl substituents. It will also be apparent that the process of the present invention can be employed to purify ring homologues of m-phenylenediamine, such as naphthalene, anthracene, tetralin, cyclohexylbenzenes, etc., containing two or more free amino groups. It may also be suggested that, by suitable applications, which will be apparent to those skilled in the art, the present invention may be employed to purify o- and p-phenylene diamines and their homologues, and simple substituted derivatives thereof, from m-phenylenediamine.

This application is a continuation-in-part of our copending application, Serial No. 528,110, filed August 12, 1953, and now abandoned.

We claim:

1. The process of recovering meta-phenylenediamines from mixtures of the same with the ortho- and para- isomers, which comprises adding to an aqueous solution of a mixture of said isomeric diamines, at a temperature below about 100° C., a water soluble compound having a chromium containing anion and selected from the group consisting of chromic acid and the chromate and bichromate salts thereof to thereby form an addition product with o- and p-phenylenediamines instantaneously and which precipitates as formed, and separating said precipitated addition product from the m-phenylenediamines before any appreciable amount of addition product of said compound having a chromium containing anion with said m-phenylenediamine is formed.

2. The process as defined in claim 1, wherein the treatment is effected at room temperature.

3. The process of recovering m-phenylenediamine from mixtures of the same with the o- and p-isomers which comprises adding to an aqueous solution of mixture of said diamines, at a temperature below about 100° C., an alkali metal chromate to thereby precipitate an addition product of said chromate and the o- and p-phenylenediamines instantaneously and which precipitates as formed, and separating said precipitated addition product from the solution of m-phenylenediamine before any appreciable amount of the addition product of said alkali metal chromate with m-phenylenediamine is formed.

4. The process as defined in claim 3, wherein the treatment is carried out at room temperature.

5. The process as defined in claim 3, wherein the alkali metal chromate specified is sodium bichromate.

6. The process of recovering m-phenylenediamine from mixture of the same with the o- and p-isomers which comprises adding to an aqueous solution of a mixture of said diamines, an alkali metal chromate to thereby form instantaneously and precipitate an addition product of said chromate and the o- and p-phenylenediamine, thereafter adding a precipitant for any excess chromate, and thereafter separating said precipitated addition product and precipitated chromate compound from the solution of m-phenylenediamine.

References Cited in the file of this patent

Malitzki: Chemische Zentralblatt, vol. 97, part I, page 609 (1926).

Cernatescu et al.: Ann. Sci. Univ. Jassy 18, p. 391–414 (1933).

Poni: Anni. Sci. Univ. Jassy 20, p. 154–172 (1934).